United States Patent [19]

Hutton et al.

[11] Patent Number: 4,897,499
[45] Date of Patent: Jan. 30, 1990

[54] OIL SOLUBLE QUATERNARY AMMONIUM MONOMERS

[75] Inventors: Thomas W. Hutton, Doylestown; Richard F. Merritt, Fort Washington, both of Pa.

[73] Assignee: Rohm and Haas Company, Philadelphia, Pa.

[21] Appl. No.: 513,951

[22] Filed: Jul. 15, 1983

Related U.S. Application Data

[63] Continuation of Ser. No. 291,010, Aug. 7, 1981, abandoned.

[51] Int. Cl.$^4$ .............................................. C07D 303/36
[52] U.S. Cl. .................................... 549/552; 560/222; 562/85
[58] Field of Search .................... 560/222; 260/501.15; 549/552

[56] References Cited

U.S. PATENT DOCUMENTS

| | | | |
|---|---|---|---|
| 3,174,874 | 3/1965 | Fikentscher | 117/155 |
| 3,678,098 | 7/1972 | Lewis et al. | 260/89.5 N |
| 3,694,393 | 9/1972 | Lewis et al. | 260/29.6 |
| 3,702,799 | 11/1972 | Lewis et al. | 162/168 |
| 3,925,442 | 12/1975 | Samour | 260/459 |
| 3,983,166 | 9/1976 | Samour | 260/481 R |
| 4,029,658 | 6/1977 | Samour | 260/247 |

FOREIGN PATENT DOCUMENTS 2430286  1/1976  Fed. Rep. of Germany

*Primary Examiner*—Richard L. Raymond
*Attorney, Agent, or Firm*—Michael B. Fein

[57] ABSTRACT

The quaternary ammonium monomers of this invention have the formula

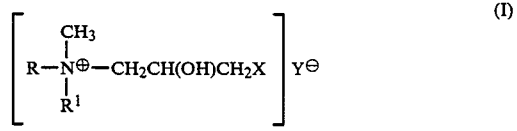

wherein
R is an ethylenically unsaturated organic group
$R^1$ is a linear $C_1$ to $C_4$ alkyl group, optionally hydroxy substituted
X is chlorine, bromine or iodine
$Y^\ominus$ is a surfactant anion.

The epoxides derivable from the halohydrin of Formula (I) are other monomers of this invention.

The monomers are soluble in common organic solvents and comonomers. The invention is also directed to addition polymers of these monomers and to methods of producing both the monomers and the polymers. The halohydrin monomers and the polymers are stable at acid pH values, although capable of reacting with materials reactive with the hydroxyl and/or halide groups. Upon heating, they are self-reactive and can become cross-linked. At alkaline pH values they become self-reactive; the polymers crosslink slowly even at room temperature, with a crosslinking rate increasing rapidly with temperature. The monomers are particularly efficiently incorporated into copolymers.

6 Claims, No Drawings

OIL SOLUBLE QUATERNARY AMMONIUM MONOMERS

This application is a continuation of application Ser. No. 291,010, filed Aug. 7, 1981, now abandoned.

BACKGROUND OF THE INVENTION

U.S. Pat. Nos. 3,678,098 and 3,702,799 discuss the state of the art of reacting epihalohydrins with a number of different organic compounds to provide a great variety of products. These patents relate more particularly to the production of unsaturated acid ester monomers, including acrylic or methacrylic acid esters, to produce useful quaternary ammonium salt monomers capable of reacting with monomers containing vinyl unsaturation by addition polymerization.

Filed on even date herewith and having the same assignee is an application entitled "Halohydroxypropyl Quaternary Ammonium Monomers and Polymers Derived Therefrom" directed to monoethylenically unsaturated quaternary ammonium salt monomers which are readily polymerizable with vinyl acetate and to the polymers produced therefrom. Also filed on even data herewith and assigned to the assignee of the instant application is an application entitled "Halohydroxypropyl Dialkyl-ar-vinylphenylenylalkyenyl Quaternary Ammonium Compounds, Polymers Thereof, And Uses Of Such Polymers As Wet Strength Agents" directed to monoethylenically unsaturated quaternary ammonium salt monomers containing aromatic components and to the polymers of such monomers.

The above identified patents and applications relate to monomers which comprise a halohydroxypropyl quaternary ammonium group, in common with the instant application. While the above-identified patents and applications provide useful compounds, the monomers are generally water-soluble salts which are insoluble in many organic solvents and potential comonomers. These monomers have strong base cations, in general, and in their polymers and copolymers this strongly cationic behavior persists. In contrast, monomers of the instant application are generally organic soluble, have a less pervasive ionic character and this lesser degree of ionic character persists in the polymers of these monomers. Homo- and copolymers of such monomers, methods and articles are also disclosed. Thus, the polymers of the instant monomers may be compounded with anionic materials, such as pigments and thickeners, without encountering severe coagulation or stability problems. These goals are achieved while maintaining, in the polymer, the desired low energy cure characteristics, i.e. curability, preferably at ambient or somewhat higher temperatures such as 20° C. to 100° C.

BRIEF DESCRIPTION OF THE INVENTION

The quaternary ammonium monomers of this invention have the formula

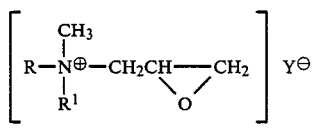

(I)

or

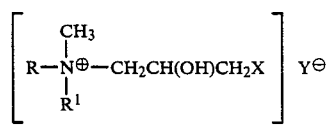

$$\left[ R-\underset{\underset{R^1}{|}}{\overset{\overset{CH_3}{|}}{N^\oplus}}-CH_2CH\underset{O}{\overset{}{\diagdown\diagup}}CH_2 \right] Y^\ominus \quad (IV)$$

wherein
R is an ethylenically unsaturated organic group
$R^1$ is a linear $C_1$ to $C_4$ alkyl group, optionally hydroxy substituted
X is chlorine, bromine, iodine or a functional equivalent of a halogen
$Y^\ominus$ is a surfactant anion.

Being salts of quaternary ammonium ions and lipophilic anions these monomers are quanternary liposalts.

In preferred embodiment (A) the ethylenically unsaturated organic group R is: $CH_2=C(R^4)-C(O)Z-A-$
wherein
$R^4$ is hydrogen or methyl,
Z is oxygen or $-NR^5-$
wherein
$R^5$ is hydrogen or hydrocarbyl having up to about 10 carbons, preferably hydrogen or methyl, and
A is a $(C_2-C_4)$ alkylene group having at least two carbon atoms in a chain between the adjoined Z and $N^+$ or A may be a polyoxyalkylene group of the formula $$-(CH_2CH_2O)_xCH_2CH_2- \quad (I)$$

wherein
x is 1 to 11 or more.

In preferred embodiment (B) R is the structure $$R^3-CH_2-(CHR^2)_n-CH_2- \quad (II)$$

wherein
n is 0 or 1
$R^2$ is H or OH, and
$R^3$ is an alkenoxy group containing an allyl group or a carbalkenoxy group containing a double bond functionally equivalent to an isolated vinyl group.

In a preferred embodiment (C) R is the structure

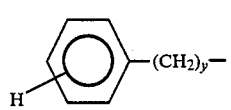

(III)

wherein
y is an integer from 1 through 4. Throughout this disclosure this structure will also be referred to as an "arvinylphenylenylalkylenyl" group.

DETAILED DESCRIPTION

A detailed description of the cation portion of those monomers of embodiment (A) wherein Z is oxygen is given in U.S. Pat. Nos. 3,678,098 and 3,702,799, both herein incorporated by reference. In the instant invention $Y^\ominus$ is required to be a surfactant anion. In this molecule the ethylenically unsaturated group is linked to the rest of the molecule by means of an ester linkage and A is preferably ethylenyl. When Z is $-NR^5-$ the linkage is by means of an amide group and A is preferably ethylenyl or propylenyl. In this embodiment, (A), preferred R groups are α,β,ethylenically unsaturated monovalent groups such as substituted $C_1$–$C_4$ alkyl acrylates or methacrylates and the corresponding substituted N-alkyl acrylamide and methacrylamides. The monomers of preferred embodiment (A) can be homopolymerized, copolymerized with each other and copolymerized with other ethylenically unsaturated monomers as taught in U.S. Pat. No. 3,678,098 column 2, line 75 through column 3, line 66.

Preferred embodiment (B) is a monomer having a surfactant anion and a quaternary ammonium cation described in the patent application Ser. No. 291,143 of T. W. Hutton for "Halohydroxypropyl Quaternary Ammonium Monomers And Polymers Derived Therefrom" filed on even date herewith and incorporated herein by reference. Preferred embodiment (C) is a quaternary ammonum monomer having a surfactant anion and a quaternary ammonium cation described in the patent application Ser. No. 291,142 of D. A. Winey for "Halohydroxypropyl Dialkyl-ar-vinyl-phenylenylalkylenyl Quaternary Ammonium Compounds, Polymers Thereof, And Uses Of Such Polymers As Wet Strength Agents" filed on even date herewith and incorporated herein by reference. For each of the monomers (I), it is preferred that it be copolymerized with monomers having similar relative reactivity ratios as taught by C. Walling in *Free Radicals In Solution,* John Wiley, 1957, Chapter 4 and Bandrup and Immerget et al, Polymer Handbook, John Wiley, 1975, Section II, n.b. pages 249-257, both teachings herein incorporated by reference.

Among the useful comonomers are: acrylate esters, preferably of $C_1$–$C_8$ alcohols, methacrylate esters, preferably of $C_1$–$C_8$ alcohols, acrylic acid, methacrylic acid, itaconic acid, styrene, alkyl styrenes, vinyl esters, preferably of $C_1$–$C_{12}$ acids especially vinyl acetate, acrylamide, methacrylamide, acrylonitrile, maleic anhydride, vinylidene chloride, N-vinyl-pyrrolidone, maleate esters, preferably of $C_1$–$C_8$ alcohols, fumarate esters, preferably of $C_1$–$C_8$ alcohols, propylene, ethylene and other olefins, vinyl chloride and vinyl toluene.

In a preferred process of the present invention, a hydrogen acid salt of the tertiary amine, $RN(R^1)CH_3$ is reacted under suitable conditions with an epihalohydrin, i.e.,

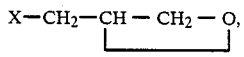

in which X is chlorine, bromine, iodine or a group functionally equivalent to a halide, to form a halohydroxypropyl dialkyl quaternary ammonium compound. Exchange of the acid salt anion for a surfactant anion then yields the compound of Formula (I). Preferably, the hydrogen acid employed to form the salt of the tertiary amine is a simple inorganic acid such as halogen acid, a phosphoric acid, a sulfuric acid, including the acids of low molecular weight organic sulfates, such as methyl sulfate, carboxylic acids and so forth, with the acids having a ionization constant, $pK_a$, of 5.0 or less; most preferred are hydrochloric and, especially so, nitric acids. An alternative process uses a hydrogen acid of a surfactant anion to form the salt of the teriary amine. The tertiary amine surfactant salt is then reacted under suitable conditions with an epihalohydrin to form the compound of formula (I). The latter alternative can be carried out in an organic solvent or a mixed water-solvent system, particularly employing a monomer as the solvent which monomer is to be a comonomer for a subsequent copolymerization with the formula (I) compound.

In brief summary, the process for producing the monomer may be seen as the conversion of a tertiary amine to a hydrogen acid salt followed by reaction of the hydrogen acid salt at a pH between about 6 and 8 with an epihalohydrin, followed by anion exchange as described hereinbelow and further acidification and dilution to the level of concentration desired for ultimate use of the monomer solution. It should be noted that once the hydrogen acid salt of the tertiary amine is formed, the reaction with the epihalohydrin can be conducted by any of the methods described in the aforementioned U.S. Pat. No. 3,678,098, particularly the examples and the section beginning at line 68 of column 1 and concluding at line 17 of column 2, which subject matter is incorporated herein by reference.

In a further embodiment the halo hydroxy propyl dialkyl quaternary ammonium compound of formula (I) is converted to the corresponding epoxide of formula (IV), by raising the pH by introducing an alkaline material. By the introduction of an equivalent or more of alkaline material the monomer of formula (I) may be completely converted to that of formula (IV) although it may sometimes be desirable to have the mixture of monomers obtained by the incomplete conversion. The alkaline materials are inorganic alkalis such as the alkaline and alkaline earth caustics, sodium hydroxide, potassium hydroxide, calcium hydroxide, the corresponding carbonates and other alkaline salts of the alkaline earth metals. It is preferred that all of the reaction steps up to the exchange of the small ion for the surfactant anion be carried out in an aqueous medium, usually comprising a water-miscible organic solvent, because the rates of reaction will be most favorable in such medium. Monomers of formula (IV) are particularly useful in both emulsion and solution polymerization processes to make both copolymers and homopolymers. The comonomers employed are those which are not reactive with the epoxide group, so the products are vinyl addition copolymers. In the solution polymerizations solvents are chosen which are not reactive with the epoxide group; aromatic hydrocarbons and mixtures of these with other non-reactive solvents are preferred.

Polymers of the monomers of formula (IV) are normally used without further activation steps. To increase the speed of the crosslinking reaction the copolymers of the monomers of formula (I) are activated by raising the pH to neutral or alkaline conditions, from the acid conditions under which they are normally maintained because of their greater stability with respect to gelation. In general aqueous systems comprising polymers of the monomers of formula (I) are maintained at pH values below 6 and are activated by raising the pH above 6 by the addition iof alkali; the more alkali, and the higher the pH resulting, the more rapid is the curing of the polymer. It is thought that the mer units derivable from the monomers of formula (I) become converted to those of formula (IV) under alkali conditions and that alkali catalyzed transformations of the glycidyl groups can cause cure and insolubilization of the polymer.

Polymers of the present invention containing mer units corresponding to formula (I) may be raised above pH 7, such as to the 9 to 12 region without fear of rapid gelation. The polymer so obtained is stable for a limited amount iof time even though such a polymer cannot be stored indefinitely without loss of functionality. Polymers of the monomers of formula (I) when activated by a caustic treatment for a period of about 1 to about 5 hours are found to be reactive and readily crosslinked particularly when used as coating, binders or adhesives; at high pH values shorter times, such as a few minutes, may be used. Thus by using polymers which represent mixtures of mer units derived from the monomers of formula (I) and those of formula (IV) and by control of pH a manufacturer may achieve balances of stability, ease of activation and reactivity or curing level not realizable in the prior art.

The glycidyl quaternary ammonium liposalt monomers of formula (IV) can be prepared from the monomers of Formula (I) by either of two methods. In one method the nitrate salt, or other small anion salt, of the halohydrin quaternary is treated with a mild base, such as potassium carbonate, in a water-organic solvent mixture and converted to the epoxide. The epoxide is then converted to a liposalt. In the second procedure the halohydrin quaternary salt of the small anion is first converted to a liposalt in solution in an organic solvent and then a mixture of the liposalt solution and water is treated with a base, such as sodium hydroxide or potassium carbonate, to convert the halohydrin to the epoxide. The epoxide will be in the organic solvent and this solution may then be washed with water to remove the traces of the small anion salt formed. The glycidyl liposalt monomers of Formula (IV) are readily polymerized in bulk, solution, emulsion or suspension polymerization processes, solution and emulsion being preferred. Care must be taken not to include among the comonomers materials which are well known to the art to be reactive with the epoxide group under the conditions chosen for the polymerization.

In both polymers and monomers the glycidyl group and the halohydrin group may be interconverted by treatment with appropriate acidic and alkaline materials. Acids, such as hydrochloric acid, when added to a system comprising the glycidyl group will convert it to the halohydrin. Alkaline materials when added to a system comprising the halohydrin group convert it to the glycidyl group.

The epihalohydrin used for the purposes of this invention may be the epiiodohydrin or the epibromohydrin. It is preferable, however, to use the epichlorohydrin. It has been found that there is a relationship between the rate of reaction (of the epihalohydrin with the amine hydrogen acid salt) and the nature of the $R^1$ constituents on the amino nitrogen. For that reason, it will generally be preferred that $R^1$ be methyl. Nevertheless, strict adherence to the selection of $R^1$ as described above will provide acceptable reaction rates of the amino salts with any of the epihalohydrins.

As will be seen from the Examples, the monomers of the present invention are suitably prepared and stored as solutions. This is not a critical limitation, and if desired, they may be concentrated and/or isolated from the reaction medium in which they are dissolved by removal of the solvent, typically by vaporization under vacuum, or by crystallization.

Preferred embodiment (B) of the present invention provides a group of ethylenically unsaturated monomers of the quaternary ammonium type which are especially useful in copolymerization with vinyl acetate type monomers to provide copolymers capable of low energy curing. Thus, this embodiment permits the development of monomers and polymers similar to those disclosed in the above U.S. patents, but with properties to meet specific application requirements particularly when copolymerization with a vinyl ester is desired.

In preferred embodiment (B) X is as defined previously, n is 0 or 1, Y is surfactant anion, $R^1$ is selected from the group consisting of $C_1$ through $C_4$ straight chain alkyl, and hydroxysubstituted $C_1$ through $C_4$ straight chain alkyl, $R^2$ is H or OH, and $R^3$ is an alkenoxy group containing an allyl group or a carbalkenoxy group containing a double bond functionally equivalent to an isolated vinyl group. The term isolated is used herein to distinguish the double bond from conjugated or cumulated double bonds. Thus, for example, acrylates and methacrylates contain vinyl groups which are conjugated with the carbonyl group whereas 3-butenoates contain isolated vinyl groups. It is also recognized, however, that it is not essential to have terminal isolated double bonds; accordingly the term "functionally equivalent" is intended to encompass the 2-substituted 5-norbornene compounds. Similarly, it is recognized that the doubly conjugated double bonds also act functionally equivalently to the isolated vinyl groups; a typical structure of this type would consist of a vinylene group enclosed between two carbonyls. The ultimate requirement is that such groups not interfere with the general characteristics of the quaternary compounds, as related to their ability to form addition copolymers and their ability of such copolymers to crosslink for the purposes described subsequently herein. A preferred species of the invention is one which n in the above formula is 1, in which $R^1$ is methyl, $R^2$ is —OH and $R^3$ is allyloxy, in which X is chloro and in which Y is a surfactant anion.

Preferred embodiment (C) of the present invention provides a group of phenylene-containing monomers of the quaternary ammonium type which can be usefully employed in the production of polymers having the desirable characteristics associated with phenylene groups without diminution of the characteristics associated with the low energy curability and quaternary ammonium functionality. In this way, the usefulness of the monomers and polymers disclosed in U.S. Pat. Nos. 3,678,098 and 3,702,799 can be broadened to meet specific application requirements and/or to enhance desirable properties.

In preferred embodiment (C) X and $R^1$ are as defined previously, y is an integer from 1 through 4, and Y is a surfactant anion. For the purposes of describing the above compounds, throughout this disclosure and in the claims the term "ar-vinylphenylenylalkylenyl" is intended to encompass all of that class of vinylphenylenyl compounds irrespective of the position of the vinyl group on the ring structure, as well as those compounds in which one or two of the four hydrogen atoms attached to the phenylene ring carbons are replaced by members of the group consisting of lower alkyl, iodo, bromo, chloro, lower alkoxy, dihydrocarbylamino, carbohydrocarbylamino, hydrocarbyloxy and carbonyloxy groups to the extent that such groups do not interfere with the general characteristics of the componds, particularly as they relate to the ability to form addition copolymers and as they relate to the ability of such copolymers to crosslink for the purposes described subsequentially herein.

A preferred species of the invention is that in which the vinylphenylenylalkenyl group is vinylbenzyl, i.e., where y in the above formula is 1, in which R is methyl, in which X is chloro and in which Y is a surfactant anion.

The surfactant anion of the instant invention is an anion which is surface active in water, that is, it is an anion which concentrates at the air-water interface and thereby lowers the surface tension of the water. Many such anions, i.e., the anionic portion of an "anionic surface active agent", are known to those skilled in this art. Among the classes of surfactant anions that are useful in this invention are those given in the classification scheme on pages 15 and 16 of Schwartz and Perry, *Surface Active Agents,* Interscience Publishers 1949, repeated here for convenience:

I. Anionic

A. Carboxylic Acids
  1. Carboxyl joined directly to the hydrophobic group (subclassification on basis of the hydrophobic group, e.g., fatty acid soaps, rosin soaps, etc.).
  2. Carboxyl joined through an intermediate linkage.
    a. Amide group as intermediate link.
    b. Ester group as intermediate link.
    c. Sulfonamide group as intermediate link.
    d. Miscellaneous intermediate links, ether, —SO$_2$—, —S—, etc.
B. Sulfuric Esters (Sulfates)
  1. Sulfate joined directly to hydrophobic group.
    a. Hydrophobic group contains no other polar structures (sulfated alcohol and sulfated olefin type).
    b. Sulfuric esters with hydrophobic groups containing other polar structures (sulfated oil type).
  2. Sulfate group joined through intermediate linkage.
    a. Ester linkage (Arctic Syntex M. type).
    b. Amide linkage (Xynomine type).
    c. Ether linkage (Triton 770 type).
    d. Miscellaneous linkages (e.g., oxyalkylimidazole sulfates).
C. Alkane Sulfonic Acids
  1. Sulfonic group directly linked.
    a. Hydrophobic group bears other polar substitutents ("highly sulfated oil" type). Chloro, hydroxy, acetoxy, and olefin sulfonic acids (Nytron type).
    b. Unsubstituted alkane sulfonic acids (MP 189 type; also cetane sulfo acid type).
    c. Miscellaneous sulfonic acids of uncertain structure, e.g., oxidation products of sulfurized olefins, sulfonated rosin, etc.
  2. Sulfonic groups joined through intermediate linkage.
    a. Ester linkage
      1. RCOO—X—SO$_3$H (Igepon AP type).
      2. ROOC—X—SO$_3$H (Aerosol and sulfoacetate type).
    b. Amide linkage
      1. RCONH—X$_{SO_3}$H (Igepon T type).
      2. RNHOC—X—SO$_3$H (sulfosuccinamide type).
    c. Ether linkage (Triton 720 type).
    d. Miscellaneous linkages and two or more linkages.
D. Alkyl Aromatic Sulfonic Acids
  1. Hydrophobic group joined directly to sulfonated aromatic nucleus (subclasses on basis of nature of hydrophobic group. Alkyl phenols, terpene, and rosin-aromatic condensates, alkyl aromatic ketones, etc.)
  2. Hydrophobic group joined to sulfonated aromatic nucleus through an intermediate linkage.
    a. Ester linkage (sulfophthalates, sulfobenzoates).
    b. Amide and imide linkages.
      (1) R—CONH—ArSO$_3$H type.
      (2) Sulfobenzamide type.
    c. Ether linkage (alkyl phenyl ether type).
    d. Heterocyclic linkage (Ultravon type, etc.)
    e. Miscellaneous and two or more links.
E. Miscellaneous Anionic Hydrophilic Groups
  1. Phosphates and phosphonic acids.
  2. Persulfates, thiosulfates, etc.
  3. Sulfonamides.
  4. Sulfamic acids, etc.

As used herein the term "surfactant anion" embraces mixtures of surfactant anions including the commercial materials which often are mixtures of species varying in hydrocarbyl chain length. Among the useful surfactant anions are those which are relatively hydrophilic in the hydrophilelipophile balance classification of surfactants.

Many types of anionic surfactants are known, and are generally classified by the chemical nature of the anion; particularly useful examples are the sulfuric esters or sulfates joined directly or through an intermediate linkage to a hydrophobic group, alkane sulfonic acids with the sulfonic or sulfonate linked directly to a hydrophobe or linked through an intermediate linkage such as an ester or an amide or ether linkage, alkyl aromatic sulfonic acids again either directly or indirectly linked, phosphates or phosphonic acids, thiosulfates, sulfonamides, sulfamic acids and so forth. Preferred anions are alkyl sulfates having an alkyl group of 6 to 20 carbon atoms, such as lauryl and myristyl sulfates; aromatic sulfonates of 8 to 24 carbon atoms, such as dodecylbenzenesulfonate; alkyl and alkaryl oxyethylene sulfates having up to 10 oxyethylene units wherein the alkyl group has at least 8 carbons and may have up to a number corresponding to 20 plus the number of oxyethylene units in the anion; and dialkyl sulfosuccinates having a total of 6 to 30 carbon atoms in the two alkyl groups. The most preferred anions are dodecylbenzenesulfonate, lauryl sulfate, myristyl sulfate, tridecyl sulfate, dioctyl sulfosuccinate, diisobutyl sulfosuccinate and dioctyl phosphate. The various anionic surfactants are usually commercially available as alkali metal salts, ammonium salts or salts of low molecular weight amines.

The lipophilic salts (I) and (IV) are prepared by mixing a water-immiscible organic solvent, water, a quaternary ammonium monomer salt and an anionic surfactant salt. The water immiscible solvent may be a ketone, alcohol, ester, aromatic hydrocarbon, but preferably is a vinyl monomer, such as an acrylate or methacrylate ester or styrene. For the best yield of liposalt the quaternary ammonium salt and the anionic surfactant salt should be mixed at equal equivalents or approximately so. After mixing the ingredients, two liquid phases result. The organic phase contains the liposalt (I) or (IV) generally in a yield and purity greater than 80% preferably 90% or even 95%. The aqueous phase contains, as the principal component, the (usually inorganic) water-soluble cation from the anionic surfactant and the (usually inorganic) water-soluble anion from the quaternary ammonium component. These water-soluble ions are not micelle-forming ions nor do they exhibit the marked tendency to concentrate at the surface of water as is characteristic of surfactant anions. When the liposalt is to be used as a comonomer in an emulsion polymerization, the preferred solvent would be one of the other comonomers. Although it is not necessary to separate and remove the aqueous layer containing the inorganic salts, its separation may be preferred in order to prepare an emulsion copolymer free of extraneous salts. Such salts frequently are detrimental to the properties of the ultimate polymer film because of increased water sensitivity. As used herein "lipophilic salt (I) or (IV)" and "quaternary liposalt" are synonymous. The term "lipophilic" being that used in the field of colloid science to denote "oil-loving" or oil soluble materials.

The following theoretical comments are not to be considered binding but are useful in teaching the utility of the monomers of the instant invention, particularly as regards their incorporation into polymers in emulsion copolymerization. The monomers are very oil soluble and comparatively insoluble in water so despite their anionic surfactant content these monomers do not behave as surface active agents. This is believed to be due to the shielding of the charged regions of the salt by the surrounding organic groups, that is the four organic groups surrounding the nitrogen atom and the large hydrocarbon attached to the charged region of the anion. Thus the monomers tend to distribute into the organic phases present in an emulsion polymerization, i.e., into the monomer particles in the monomer emulsion and the polymer latex particles in the polymer emulsion and in both of these during the polymerization. Compared to any of the surface active agents normally employed in emulsion polymerization these monomers do not concentrate effectively at the interface between the aqueous phase and the growing polymer particle. The presence of these monomers in the growing latex polymer particle is believed to have the very important result that the crosslinking quaternary monomer becomes incorporated uniformly into the polymer; as opposed to being substantially on the polymer particle surface. The quaternary monomer, being a relatively expensive monomer, its more effective use, due to uniform incorporation, particularly its not being essentially lost as watersoluble polymer, leads to both better crosslinking and lower cost.

The liposalt monomers of the instant invention are organic soluble and water insoluble in general. Thus, the quaternary ammonium liposalt monomers are readily employed in organic solution polymerizations, and are particularly well adapted to polymerization processes in which it is desirable to form a mutual solution of some or all of the monomers before polymerization. This solubility property is particularly advantageous in bulk polymerizations, where it is desirable to form a solution of the monomers, as well as in suspension polymerization. In the case of emulsion polymerizations, the quaternary ammonium monomers of the prior art tend to segregate during polymerization so as to give quaternary ammonium-rich polymer fractions with higher water solubility than the remainder of the polymer. These water rich fractions contribute to water sensitivity of the final products, such as coatings, binders or adhesives made from the polymer emulsion. It is particularly noteworthy that the low energy cure characteristic of the functional quaternary ammonium mer units of the polymer made from the monomer of the instant invention is retained.

The quaternary ammonium monomers of the present invention are polymerizable, and for this purpose, their solutions may be used directly. Any known polymerization initiator of the free radical type can be used. Examples are t-butyl hydroperoxide, ammonium persulfate, and alkali metal persulfates, such as those of sodium or potassium. They are used at the customary dosages such as 0.1 to 2% by weight based on monomer weight. They may be used with sodium hydrosulfite or other reducing agents in redox systems. Alternatively, the polymerization may be effected by actinic radiation.

Emulsion polymerization procedures are particularly effective for polymerization of the low energy cure quaternary ammonium monomers of the instant invention. As emulsifiers in the emulsion polymerization any of the commonly used nonionic surfactants may be employed, such as the alkyl phenyl poly ethoxy ethanols having from about 10 to 50 or more oxyethylene units, and any of the anionic surfactants, preferably the species listed above. The use of the comparatively inexpensive anionic surfactants as emulsifiers with the quaternary ammonium liposalt monomers of the instant invention further distinguishes these monomers from the quaternary monomer of the prior art. The prior art monomers, not being liposalts, were generally employed with nonionic surfactants or cationic surfactants. The anionic surfactant stabilized emulsion polymers of this invention can of course be mixed with the common anionically stabilized emulsion polymers of commerce to achieve specific properties and various synergistic effects.

Any ethylenically unsaturated monomers having a group

may be polymerized with the quaternary monomers of the present invention, under conditions such that the polymerization medium is maintained moderately acidic, preferably in the pH range 4 to 7. Thus by this method, it is possible to produce homopolymers and/or copolymers of the present quaternary monomers with the quaternary monomers of the aforementioned U.S. Pat. No. 3,702,799 beginning in Column 4 at line 51 and continuing through line 22 of Column 5, which disclosure is incorporated herein by reference.

In identifying suitable vinyl systems for reaction with the quaternary ammonium liposalt monomers care should be paid to the reactivity ratios of the monomers and/or to the Q and e values as determined in accordance with the Alfrey-Price Qe scheme as explained in *Free Radicals In Solution* and the *Polymer Handbook* as given above. Utilizing this type of information a proper choice of embodiment of this invention can be made from its expected relative reactivity ratios $r^1$ and $r^2$ and that of the vinyl monomers. It is preferred that the relative reactivity ratios of the liposalt monomer and the comonomers should differ by no more than a factor of 10 and neither should be 0. Clearly the Q and e values of the quaternary ammonium liposalt monomer should be similar to those of the vinyl monomers used to form a copolymer.

The quaternary ammonium liposalt monomers of the present invention can be homopolymerized but the greatest advantages in their use are obtained in copolymerization which employs the excellent organic phase solubility characteristic of these monomers.

Among the preferred monomers used with the quaternary ammonium liposalt monomers are acid and acid anhydride monomers. Ordinarily the use of acid monomers (anionic) in copolymerization with quaternary ammonium monomers (cationic) is avoided however in the instant invention these are among the preferred polymer compositions. Preferably the amount of acid comonomer employed is less than or about equal to the amount of quaternary ammonium monomer, on a molar basis, but in some instances a molar excess of acid is desired. The acids may be any of the α, β-unsaturated acids, such as the monocarboxylic acids, preferably acrylic, methacrylic, crotonic and half esters of maleic and fumaric, with acrylic and methacrylic being most preferred; as well as polycarboxylic acids such as maleic, fumaric and, preferably, itaconic. The quaternary ammonium liposalt monomer content is, by weight, usefully up to 100% with the ranges 90 to 100% and 0.2 to 50% being preferred 0.5 to 10% more preferred and 1 to 5% most preferred. The carboxylic acid monomer content is by weight, preferably up to 5%, more preferably 0.1 to 1%.

A surprising feature of the copolymers made from the monomers of this invention is that many exhibit little, if any, cationic character. This being the case, despite the polymers having cationic mer units, they may be compounded with commonly used anionic materials (such as pigments, thickeners, dyes, fillers, etc.) without coagulation, excess thickening, grit formation or other signs of unacceptable stability on storage. In certain applications however it may be desirable that the polymers exhibit cationic character. This may be achieved by employing quaternary ammonium monomers which are not liposalt monomers, in addition to the liposalt monomers of formula I, in the preparation of the polymer. In general it is perfectly feasible to employ the formula I monomers in conjunction with other quaternary ammonium monomers, including: those which have the same cation as the monomers of this invention but do not have a surfactant anion; those which have a surfactant anion and a quaternary ammonium cation not of this invention; and those quaternary ammonium monomers different both with respect to anion and cation from those of the instant invention. Of course these various other quarternary ammonium salts do not contribute to the peculiar advantages of the instant liposalt monomers, particularly the low energy cure characteristics and solubility in organic solvents and monomers.

Examples of quaternary ammonium monomers which may be employed among the comonomers in preparing the polymers of the instant invention are those of Silvernail et al taught in U.S. Pat. No. 3,011,918 column 2, lines 17 to 37 as ". . . vinylbenzyl quaternary ammonium compounds having the general formula

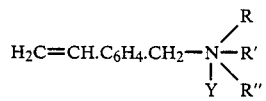

wherein R, R' and R" each represents individually a monovalent radical selected from the group consisting of $CH_2OHCH_2$—, $CH_3CHOHCH_2$—, $CH_2OHCHOHCH_2$— and alkyl, aryl cycloalkyl and aralkyl hydrocarbon radicals, and R, R' and R" collectively represent the trivalent radical of the formula:

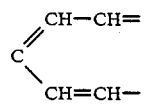

wherein the three valences are attached to the nitrogen atom, the said R group containing a total of not more than 12 carbon atoms in the sum of the constituent radicals, . . ."; those of Fordyce et al, taught in U.S. Pat. No. 3,023,162, as the mer unit present in the polymer, column 2, lines 10 to 31 as ". . . quaternary unit having the structure of the formula:

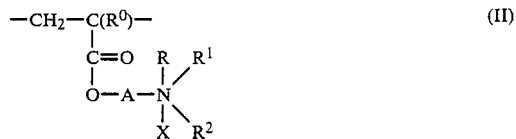 (II)

where
$R^o$ is selected from the group consisting of H and $CH_3$ and is preferably $CH_3$,
A is selected from the group consisting of —($CH_2$)$_2$—, —($CH_2$)$_3$—, and —$CH_2CH(CH_3)$—,
$R^1$ is selected from the group consisting of methyl and ethyl,
$R^2$ is selected from the group consisting of methyl and ethyl,
R is selected from the group consisting of β-hydroxyethyl, β-hydroxypropyl, and α-hydroxypropyl, and
X is selected from the group consisting of hydroxyl and negative, salt-forming radicals and atoms.
Examples of these negative radicals include halides, such as chloride, bromide, and iodide, sulfate, e.g., the methyl sulfate anion, acetate, tartrate, propionate, citrate, phosphate, and so on."; and those of Samour et al in U.S. Pat. No. 3,861,948, column, 1, line 65 to column 2, line 23 having the formula

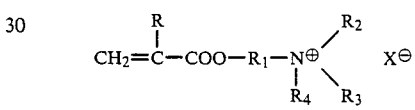

in which R represents hydrogen or methyl; $R_1$ represents an alkylene group having 2 to 12 carbon atoms including ethylene, propylene, butylene, hexylene and decylene or $R_1$ represents a 2-hydroxypropylene group; $R_2$ and $R_3$ each independently represents an alkyl group having from 1 to 4 carbon atoms; $R_4$ represents (a) an alkyl group having from 1 to 6 carbon atoms, or (b) a group having the formula

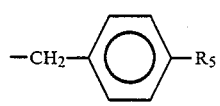

in which $R_5$ represents hydrogen or an alkyl group having from 1 to 6 carbon atoms, or (c) a group having the formula —$CH_2$—Y in which Y represents —$CONH_2$, —COOH, or —$COOR_6$ in which $R_6$ represents an alkyl group having from 1 to 6 carbon atoms; and in which X represents Cl Br, or —$SO_4R_7$, where $R_7$ represents methyl, ethyl, or tolyl. Many other quaternary compounds known to those skilled in the art are also useful.

Polymers of the compounds of the instant invention offer wide utility because of their ability to further polymerize and to crosslink via self-reaction and also because of their ability to react with a wide variety of other materials. Activated epoxide groups are well known to those skilled in the art to be reactive with many coreactants, particularly with those with replaceable hydrogen, such as alcohols, acids, primary and secondary amines, phenols, etc. The polymers are particularly appropriate when used, alone or formulated, in industrial applications such as in binders, coatings and adhesives.

The polymers are particularly useful in clear or pigmented coatings for use on soft substrates, such as vinyls, leather and paper, as well as on hard substrates such as wood, metal, mineral and road surfaces. The coating, in these uses, serves the various well known decorative and protective purposes, such as wear resistance, solvent resistance, detergent resistance, abrasion resistance, appearance improvement, etc. As pigment print binders, the polyers are useful in printing inks which furnish durable design or decoration for woven or non-woven fabrics, films, rigid panels, etc. Fibers of either synthetic or natural materials, such as polyolefins, polyesters, rayon, nylon, fiberglass, wood, wool, etc., may be bonded by means of these polymers to furnish non-woven fabrics, particularly those of high durability for uses such as clothing interliners, fiberfill insulation, filter material, diaper components, and various forms of wearable and decorative fabrics. Used alone or in formulations, these polymers offer strong and durable adhesives particularly useful for the lamination of fabrics, woven or non-woven, films, hard panels, foamed materials, and the like, in any combination to form two-layer or multilayer laminates. Employed as a flock adhesive, or a component thereof, the polymer serves to adhere fiber blocks of materials such as nylon, polyester or rayon to a substrate, such as fabrics, either woven or non-woven, rigid panels and foams. Towels, wipes and other paper products with good mechanical strength and water resistance are made by binding wood fibers, or mixtures of these with other fibers, employing the instant polymers as binders. Another application area is in the tanning of leather. Polymer latices are particularly useful in all of these applications, although polymers prepared in other ways may be suitable alternatives, such as solution polymers for topcoats or adhesives.

To assist those skilled in the art to practice the present invention, the following modes of operation are suggested by way of illustration, parts and percentages being by weight and the temperature in degrees celcius unless otherwise specifically noted. The following abbreviations are used:

| | |
|---|---|
| CH—DMA | The quaternary ammonium ion obtained by the addition of epichlorohydrin to dimethylaminoethyl methacrylate |
| DDBS | Dodecylbenzenesulfonate |
| DiB | Diisobutyl sulfosuccinate |
| AA | Acrylic acid |
| EA | Ethyl acrylate |
| IA | Itaconic acid |
| AN | Acrylonitrile |
| BA | Butyl acrylate |
| MMA | Methyl methacrylate |
| AM | Acrylamide |
| MA | Methyl acrylate |

EXAMPLE 1

Preparation of a Liposalt

In a vessel, thoroughly mix 80 g. ethyl acrylate, 133.6 g. of 30.4% aqueous CH-DMA nitrate (40.6 g.), 45.24 g. sodium dodecylbenzenesulfonate (DDBS) and 2 g. 1.6N nitric acid. The two liquid layers are allowed to separate. The upper (organic) layer, 169.4 g., contains 71.7 g. of solids having 0.687 meq./g. hydrolyzable chloride. The lower (aqueous) layer 87.7 g., contains 13.4 g. of solids having 0.207 meq./g. hydrolyzable chloride. Of the 32.5 g. of the CH-DMA cation charged, 29.2 g. (90%) is found in the organic layer and 4.0 (12%) in the aqueous layer. Of the theoretical amount of liposalt (74.75 g.) 67.1 g. (90%) can be accounted for in the organic phase.

In the same way liposalts of CH-DMA are prepared using as the anionic surfactant $CH_3(CH_2)_{11}(OCH_2CH_2)_4SO_4Na$, $C_8H_{17}$—$C_6H_4$—$(OCH_2CH_2)_4SO_4Na$, the sodium diisobutyl, dihexyl, dicyclohexyl and dioctyl sulfosuccinates, sodium 2-ethylhexylsulfate and sodium lauryl sulfate. Also in the same way with sodium DDBS, liposalts of the epichlorohydrin adduct of dimethylaminopropyl methacrylamide, ar-vinylbenzyl dimethyl amine and 1-allyloxy-3-dimethylamino-2-hydroxypropane are prepared. All are then incorporated into copolymers by the procedure of Example 2.

EXAMPLE 2

Preparation of Copolymer

Emulsion:

A monomer emulsion is prepared having 279 g. $H_2O$, 64.8 g. octylphenylpoly(39)oxyethylene ethanol, 2.38 g. AA, 1154.5 g. EA and 65.4 g. of CH-DMA dodecylbenzenesulfonate. A 3-liter, 4-necked flask is equipped with a stirrer, thermometer condenser, 50-ml. buret and monomer feed means. A continuous addition redox polymerization is carried out under nitrogen, in the presence of an additional 372 grams of water initially charged to the flask, at about 60° C. over a period of about three hours. At the end of the polymerization a free radical chaser is employed to decrease the level of unreacted monomers; the flask contents are cooled and 3.5 g. sodium acetate dissolved in 12 g. water are added. The final polymer emulsion has a pH of 4.6, a viscosity of 190 cps and a solids of 58.5%.

In the same way emulsion polymers are prepared using CH-DMA liposalts containing as the anion diisobutylsulfosuccinate, dihexylsulfosuccinate, dicyclohexylsulfosuccinate, dioctylsulfosuccinate, 2-ethylhexylsulfate, lauryl sulfate, Polystep ® B-10 and Polystep ® B-27 (Stepan Chemical Co.)

EXAMPLE 3

Copolymerization Efficiency of Quaternary Liposalts

Emulsion copolymers at 56% solids having the composition 96.65 EA/3 CH-DMA liposalt (calculated as nitrate)/0.35 MAA are prepared from three of the liposalts of Example 1. Each emulsion, 40 g., is diluted with 120 g. of water and 23 g. of each diluted emulsion (14% solids) is centrifuged to separate the polymer solids from the serum. The serum phase is analyzed for solids and total chloride; the total chloride content of the centrifuged sample is 0.299 meq. A control sample is made utilizing CH-DMA nitrate in place of the liposalts; the total chloride content of this centrifuged sample is 0.386 meq. Results are summarized as follows:

| Anion | Serum Weight, g. | Total Chloride of Serum, meq. | Solids of Serum, % | Fraction of Quaternary Liposalt or nitrate in Serum |
|---|---|---|---|---|
| 2-Ethylhexylsulfate | 18.7 | 0.021 | 0.78 | 0.07 |

-continued

| Anion | Serum Weight, g. | Total Chloride of Serum, meq. | Solids of Serum, % | Fraction of Quaternary Liposalt or nitrate in Serum |
|---|---|---|---|---|
| Lauryl sulfate | 18.2 | 0.013 | 0.57 | 0.04 |
| Dodecylbenzene-sulfonate | 18.2 | 0.009 | 0.47 | 0.03 |
| Nitrate (comparative) | 18.3 | 0.286 | 0.90 | 0.74 |

The results demonstrate that more than 90% of the quaternary liposalt is found in the solid polymer phase of the emulsion whereas only 25% of the quaternary salt is in the solid polymer phase when the counterion of the quaternary is nitrate.

In a similar way emulsions with composition 98.9EA/0.1AA/1.0 CH-DMA liposalt (calculated as nitrate) are analyzed for the fraction of quaternary liposalt in the serum phase with the following result.

| Lipophilic Anion | Fraction of Quaternary in Serum |
|---|---|
| Polystep ® B-10, Stepan Chem. Co. $nC_{12}H_{25}(OC_2H_4)_4SO_4Na$ | 0.07 |
| Diisobutylsulfosuccinate | 0.09 |
| Dodecylbenzenesulfonate | 0.08 |

EXAMPLE 4

Crosslinking of Quaternary Liposalt Copolymer

The crosslinking, as measured by volume swelling ratios and solvent soluble fraction, of cured emulsion polymers prepared with CH-DMA nitrate are compared to those containing CH-DMA liposalts. Emulsions, 100 g. at 50% solids, are treated with 10% sodium hydroxide (0.5-1.0 g), except for Example 4A which is treated with four parts of 15% sodium sesquicarbonate; all represent an excess of base over the stoichiometric requirement for activation. About 0.8 g. of the treated emulsion is applied to a spot plate cavity and allowed to air dry and cure for one week at room temperature. The cured pellets as made are allowed to swell for four days in 25-40 g. of portions dimethylformamide (DMF) and chlorobenzene ($C_6H_5Cl$) to determine the volume swelling ratio and the solvent soluble fraction. Results are summarized in the following table.

Both the lower volume swelling ratio and lower solvent solubles shown in the copolymer for 4B and 4C demonstrate the superior crosslinking achieved by quaternary liposalts even when they are present in the copolymer composition at a lower concentration.

EXAMPLE 5

Preparation of Copolymer Emulsion-Liposalt Formed "in situ"

A monomer emulsion is prepared from 327 g. $H_2O$, 139.5 g. octylphenylpoly(39)oxyethylenethanol, 12.8 g. itaconic acid, 2412 g. EA, 233.3 g. CH-DMA nitrate 33% aqueous, and 307 g. sodium DDBS 28% aqueous. A 5-liter 4-necked flask is equipped as in Example 2. using t-butylhydroperoxide and sodium formaldehyde sulfoxylate as a redox initiator system, a continuous addition polymerization is carried out under nitrogen, in the presence of an additional 620 grams of water charged to the flask initially and 200 grams of water introduced with the redox initiator. Polymerization of 100 g. of monomer emulsion is initiated at 50° C., the temperature allowed to rise to 60° C. where it is maintained for three hours during the uniform continuous addition of the remaining monomer emulsion and redox initiator. At the end of the polymerization a free radical chaser is employed to decrease the level of unreacted monomers; the flask contents are cooled and 7.6 g. of sodium acetate in 36 g. of water added. The final emulsion has a solids of 59.5% and a viscosity at 240 cps.

Copolymers of the other quaternary liposalts described in Example 1 are prepared by the same procedure as in Example 3 and crosslinked as in Example 4; all exhibit low swelling in solvents and low fraction soluble, thus are crosslinked.

EXAMPLE 6

Liposalt Emulsion Polymer Print Paste Binder

An emulsion copolymer of composition 95EA/5CH-DMA.DDBS is tested as a binder by formulation into a print paste. The print paste is made from a 40% solids copolymer emulsion activated by adding 5%, by weight on emulsion weight, 1N sodium hydroxide and allowing to stand for 1 hour. 22 parts of this activated liposalt is added to a vessel and then, under high speed agitation there is added 150 parts of an 0.8% solution in water of Carbopol ® 845, polyacrylic acid thickener, neutralized with ammonia to a pH of 8, and 15 parts of a 20% aqueous dispersion of Blackman Uhler phthalocyanine blue. The mixture is agitated until uniform in the open vessel and found to have a viscosity of about 20,000 centipoise as measured by a Brookfield viscometer. The paste is applied to 65% polyester/35% cotton (P/C) and 70% polyester/30% rayon (P/R) fabrics along with a control print paste using a standard acrylic binder. After four days cure at room temperature the fabrics are tested for wet crock, dry-cleanability and IIIA wash durability. The results are contained in the following table.

Cure of Copolymers Containing Liposalts

| Example | Copolymer Composition[a] | Base[b] | Volume Swelling Ratio DMF | Volume Swelling Ratio $C_6H_5Cl$ | Solvent Solubles, % DMF | Solvent Solubles, % $C_6H_5Cl$ |
|---|---|---|---|---|---|---|
| 4A | EA/CH—DMA Nitrate 96.3/3.7 | | 37.8 | 33.4 | 49 | 42 |
| 4B | EA/CH—DMA DDBS/AA-98/1.8/0.2 | 1.0 | 9.6 | 9.1 | 14 | 7 |
| 4C | EA/CH—DMA DDBS/IA-98/1.8/0.2 | 0.39 | 11.8 | 12.1 | 22 | 16 |
| 4D | EA/CH—DMA Nitrate/IA-98/1.8/0.2 | 0.39 | 15.4 | 24.9 | 33 | 27 |

[a]DDBS = dodecylbenzenesulfonate - The amount of quaternary salt in the copolymer is calculated on the basis of nitrate as the counterion.
[b]NaOH g/100 g copolymer added for activation of the copolymer.

An attempt to formulate a print paste with an emulsion copolymer having the composition 95EA/5 CH-DMA nitrate fails because of flocculation of the paste.

TABLE I

| Binder | Wet Crock | | Dry Cleanability | | III A Wash Durability | |
|---|---|---|---|---|---|---|
| | P/R | P/C | P/R | P/C | P/R | P/C |
| 95EA/5CH-DMA-DDBS | 3.0 | 3.3 | 2.5 | 4.0 | 3.75 | 2.0 |
| Commercial | 1.75 | 3.0 | 1.5 | 4.0 | 1.5 | 1.5 |

Rating Scheme:
1. Severe color loss
2. Med.-severe color loss
3. Moderate color loss
4. Slight color loss
5. No color loss Test Methods:
Wet crock - AATCC(American Association of Textile Chemists and Colorists) method 8-1969
Dry Cleanability - Tested in perchloroethylene
III A - Wash durability - AATCC method 61-1969

EXAMPLE 7

Other Liposalt Copolymer Compositions

Emulsion copolymers of the following compositions are prepared, activated by base, air dried and cured. All exhibit the markedly lower volume swelling ratio and solvent solubles compared to inorganic salt controls.

88 EA/10 AN/1.8 CH-DMA DDBS/0.2 AA
86.1 EA/10 AN/3.7 CH-DMA DDBS/0.2 AA
84.2 EA/10 AN/5.6 CH-DMA DDBS/0.2 AA
88.1 EA/10 AN/1.0 CH-DMA,Ep-110+/0.7 CH-DMA nitrate/0.2 AA
94.8 EA/0.9 CH-DMA DDBS/0.5 CH-DMA nitrate/0.2/AA
73.8 EZ/24.6 BA/0.9 CH-DMA DDBS/0.5 CH-DMA nitrate/0.2 AA
87.6 EA/10 AN/2.4 CH-DMA DDBS
45 EA/45 MMA/10.0 CH-DMA lauryl sulfate
45 EA/45 MMA/10.0 CH-DMA DDBS
47.4 EA/47.4 BA/5.0 CH-DMA DDBS/0.2 AA
10/EA/80 MMA/10 CH-DMA DDBS
95 EA/5 CH-DMA DDBS
90.5 EA/4 AM/5.0 CH-DMA DDBS
98.1 EA/0.1 AA/1.8 CH-DMA DDBS*
94.85 EA/0.1 AA/3.25 AM/1.8 CH-DMA DDBS*
98/1 EA/0.1 AA/1.8 CH-DMA DDBS*
94.85 EA/0.1 AA/3.25 AM/1.8 CH-DMA DDBS*
98 BA/0.2 AA/1.8 CH-DMA DDBS*
98.8 EA/0.2 IA/1 CH-DMA* dioctylsulfosuccinate

*These are activated, 20 to 24 hours before testing, using 2 equivalents of 1,6 hexanediamine to equivalent of polymerized quaternary group and acid group taken together.
+Alipol ®EP-110 believed to be nonylphenylpoly(8) ethoxyethyl sulfate.

EXAMPLE 8

Preparation of Glycidyl Liposalts of Formula (IV)

A flask is charged with 100 g. water and 161 g. (1.0 mole) p-vinyl-N,N-dimethylbenzylamine, cooled to 15° C., and 90 g. of 67% $HNO_3$ charged gradually to bring the pH to 7.0. Epichlorohydrin, 100 g. (1.09 moles), is added over two hours to the reaction mixture at 25° and at a pH of 7 to 7.5. The pH being maintained by periodic additions of sodium carbonate or nitric acid. After 24 hours the reaction mixture is concentrated to dryness to yield 320 g. of a syrup containing 3.25 meq./g. at combined chloride. This syrup is the quaternary ammonium nitrate.

In a similar way dimethylaminopropylmethacrylamide is treated with nitric acid and epichlorohydrin to form its adduct, another quaternary ammonium nitrate.

To 32 g. (0.1 mole) of the benzylammonium quaternary prepared above, dissolved in 300 g. of 80 acetone/20 water, is added 25 g. of potassium carbonate and the mixture stirred for 24 hours. Twenty grams of a lower aqueous layer is withdrawn, the top layer washed with 15 g. $H_2O$ and concentrated to a 34.8% solids solution which is found to contain 0.31 meq./g. of chloride ion, 0.015 meq./g. of combined chloride and 0.96 meq./g. of epoxide (by addition of HCl in ethanol/water and magnesium chloride).

In a similar way the quaternary ammonium halohydrin of dimethylaminopropylmethacrylamide is converted to a glycidyl quaternary ammonium salt.

In the manner of Example 1 the two glycidyl quaternary ammonium salts are converted to DDBS liposalts as solutions in ethyl acrylate. Following the same procedure other monomers, butyl acrylate, styrene, vinyl acetate, vinyl chloride and methylmethacrylate, are substituted for the ethyl acrylate to produce a liposalt in solution in the given monomer.

EXAMPLE 9

Preparation of a Solution Polymer

A monomer-initiator mixture is prepared from 200 g. of ethyl acrylate, 25 g. of a 20% ethyl acrylate solution of CH-DMA dodecylbenzenesulfonate, 3.0 g. t-butylperoctoate and 125 g. toluene. A flask equipped with a thermometer, a Dean-Stark trap, a condenser, a stirrer and an addition funnel is charged with 100 g. toluene and 50 g. of the monomer-initiator mixture. The flask contents are blanketed with nitrogen, heated to reflux (110° C.) and the remainder of the monomer-initiator mixture fed over 2 hours. At the end of the polymerization a charge of 1.0 g. t-butylperoctoate is made to decrease the level of unreacted monomers. Several grams of water originating from the liposalt solution is collected in the Dean-Stark trap. The polymer solution has a viscosity of 15,700 cps and a solids of 49.5%.

Using the same process, solution polymers are prepared from the glycidyl quaternary ammonium dodecylbenzenesulfonate of Example 8 derived from p-vinyl-N,N-dimethylbenzylamine by copolymerization of one part with ten parts, by weight, of vinyl acetate. The dimethylaminopropyl methacrylamide based quaternary ammonium liposalt, as prepared in Example 8, is solution copolymerized with styrene and butyl acrylate, ten parts of each of the latter to one of the liposalt to furnish a hydrophobic copolymer with a well incorporated quaternary ammonium salt. The incorporation in such a polymer is one of the unique features of the monomers of this invention, in addition to which the polymer is readily crosslinked.

EXAMPLE 10

Emulsion Copolymer of Glycidyl Quaternary Ammonium Liposalt

In the same way as in Example 2 an emulsion polymer with EA is prepared from the glycidyl quaternary ammonium dodecylbenzenesulfonate salts derived from p-vinyl-N,N-dimethylbenzylamine and N,N-dimethylaminopropylmethacrylamide (Example 8). Emulsion polymerization of these glycidyl monomers of Formula (IV) is carried out in the pH range between 2 and 8, preferably between 4 and 7 to produce glycidyl-functional polymers. These polymers are utilized to prepare crosslinked polymers useful as binders, coatings and adhesives, i.e., useful as adherents to substrates.

EXAMPLE 11

Copolymer Used as a Paper Binder

Employing the process of Example 2, a polymer is prepared having the composition 98.1 EA/1.8 CH-DMA DDBS/0.1AA. A second polymer having the same composition, is prepared by a thermal reflux emulsion polymerization process. Roll towels employing these polymers as binders are prepared and tested as follows:

Procedure:

1. Cut two 18" lengths of #4 Whatman Chromatographic paper per sample.
2. Condition at 72° F. and 50% for 24 hours.
3. Weight conditioned paper to obtain tare weight.
4. Activate polymers one hour prior to use by adding 5% of a 15% sodium sesquicarbonate solution based on total volume of emulsion.
5. Prepare 400 gms (1 pint) of binder at desired solids.
6. Dip the paper in the binder and feed through rollers in Birch padder. Lay damp paper out flat to dry for one hour.
7. Conditiin saturated samples at 72° F. and 50% R.H. for at least 8 hours.
8. Cure all sheets at 240° F. for one minute.
9. Condition sheets at 72° F. and 50% R.H. for 24 hours to allow for moisture pick-up.
10. Cut each sheet to sixteen 1"×6" strips, eight for dry tensiles and eight for wet tensiles.
11. For both dry and wet tensiles use Model 1130 Instron tensile test machine. Set up Instron as follows:

| | |
|---|---|
| Gap between jaw | 4 inches |
| Cross head speed | 2 inches per minute |
| Calibration | 50 lbs. full scale load for dry tensile. |
| | 50 lbs. full scale load for wet tensile. |

12. Elongate all samples to break. Immerse the wet tensile strips in 1% Aerosol OT solution for about 15 seconds.
13. Read and record maximum stress of each sample to the nearest 0.1 pound. Report the average of the eight replicates as the wet and dry tensile strength in pounds per inch of width.

The paper utilizing the redox prepared polymer has average tensile strengths of 2.9 lbs./inch wet and 9.8 lbs./inch dry. The corresponding values for the paper made with the thermal reflux polymer are 2.4 and 9.8 lbs./inch.

EXAMPLE 12

Aqueous Topcoat For Leather

A copolymer having the composition 47EA/47.5-MMA/5CH-DMA DDBS/0.5AA, prepared by the process of Example 2 at 41% total solids, is activated by adding 17 ml. of 0.5N NaOH to 100 g. of the latex, allowing to stand one hour and then adjusting the pH to 9.5 with the NaOH solution. A 10% copolymer solids formulation is prepared as follows:

| | |
|---|---|
| Water | 57.4 g. |
| Zonyl ® FSA(DuPont) | 1.0 |
| Polymer latex (35.1% solids) | 28.6 |
| Thickener | 3.0 |
| Coalescent | 10.0 |

The leather substrate used in Armira factory base coated and plated smooth corrected grain block military leather having a block pigmented acrylic basecoat.

The topcoat is spray-applied and test in comparison with two commercial materials: (1) a plasticized nitrocellulose lacquer (N/C lac.), (2) a plasticized nitrocellulose lacquer aqueous emulsion (N/C emuls.). The results are in the following table.

| Property | N/C Lac. | N/C emuls. | CH-DMA Copolymer |
|---|---|---|---|
| Sprayability | good | good | good |
| Add-on (gm./ft.² dry) | 0.30 | 0.36 | 0.30 |
| Appearance | good | good | good |
| Gloss | good | good | sl. dull |
| Tape adhesion | good | good | good |
| Block resistance | good | good | good |
| Wet crock, 4 lbs.-100 lbs. | no damage | no damage | no damage |

EXAMPLE 13

Durable Non-woven Polyester Farbic

Copolymer latices, having the compositions given in the table below, are prepared by the method of Example 2. The latices are formulated with 0.05% antifoamer, 0.4% wetting agent, 0.8% penetrant, 0.8% stabilizer and 1.25% sodium sesquicarbonate (NaHCO$_3$.Na$_2$CO$_3$.2H$_2$O) activator. Final bath solids is 21.5%. The formulation is applied to the web which is dried at 150° F./8 min. and cured at 240° F./2 min. The sheets are tested for (1) IPA wet CD tensile, (2) conditiion after 5 dry-cleanings and (3) condition after 10 washes/dryings.

IPA wet CD (cross-direction) tensile is measured by cutting strips 1×4 in. (long dimension in cross-machine direction), soaking the strips 30 min. in isopropanol, and pulling them apart on an Instron Model TMM at 12 in./min. using a 2 in. gap. Maximum tensile at the break is recorded.

Dry-clean and wash durability are determined by cutting 5 in. squares of treated web and sewing them onto 10×10 in. pieces of cotton print cloth, then running them through five dry-clean or 10 wash and dry cycles. Dry-cleaning is done in th Speed Queen ® commercial dry-cleaner which uses Dowper ® CS (perchloroethylene charged with a little dry-cleaning soap). Washing is done in the Maytag Washer using a "full" setting, water at 130° F., 1 cup of Orvus ® and eight terry-cloth towels. Samples are dried in the dryer after each wash. Results are in the following table, Examples 13A, 13B and 13C.

EXAMPLE 14

Non-woven Rayon Fabric

Non-woven rayon webs, lightly prebonded with polyvinyl alcohol, are bonded by saturation with a formulated latex of a polymer prepared by the method of Example 2. The web weighs 0.5 oz./yd.² and the polymer pickup is 43%. The latexes are formulated with 1% Aerosol ® OT, activated with two equivalents of NaOH per quaternary group and allowed to stand two hours prior to padding. Results are in the table below; Examples 14A, 14B and 14C.

| | | | Web Properties[1] Condition After | |
|---|---|---|---|---|
| Example | Binder Description | Sodium Sesqui Carbonate g/100 g binder solids | 5 Dry Cleans | 10 Washes |
| 13A | 96 EA/2 AM/0.2 AA/1.8 CH—DMA DiB[3] | 1.26 | 6.0 | 3.0 |
| 13B | 98 EA/0.2 IA/1.8 CH—DMA DDBS | 1.25 | 6.0 | 4.0 |
| 13C | 93.2 EA/5 MA/1.8 CH—DMA DDBS | 2 | 6.0 | 3.0 |

Carded Webs: Dacron Polyester Type 371, Merge (13F1), 1.5 den., 1.5 in Staple
Unbonded Web Weights 24.3 g/sq. yd.
Dry Add-on 8.0% dry binder/wet weight
Final Sheet Weight: 43.7 g./sq. yd.

[1] Rating 1-excellent 6-poor
[2] Activated with 0.2% NaOH/100 g. binder solids
[3] DiB is diisobutyl sulfosuccinate

| Ex. | Saturant | Dry Tensile MD | Dry Tensile CD | Isopropanol Tensile CD | Drape | Dry Hand |
|---|---|---|---|---|---|---|
| 14A | EA/AN/CH—DMA DDBS/AA 88/10/1.8/0.2 | 8.3 | 1.1 | 0.3 | 39 | 2.0 |
| 14B | EA/AN/CH—DMA DDBS/AA 86.1/10/3.7/0.2 | 7.7 | 1.0 | 0.3 | 41 | 3.4 |
| 14C | EA/AN/CH—DMA DDBS/AA 84.2/10/5.6/0.2 | 8.7 | 1.0 | 0.3 | 41 | 1.2 |

Low numbers indicate greater drape and softer hand.
MD = Machine Direction

We claim:

1. An ethylenically unsaturated quaternary ammonium compound of the formula $$\left( \begin{array}{c} CH_3 \\ | \\ R-N^+-CH_2CH(OH)CH_2X \\ | \\ R^1 \end{array} \right) Y^-$$

or the formula $$\left( \begin{array}{c} CH_3 \\ | \\ R-N^+-CH_2CH-CH_2 \\ | \quad \quad \backslash \; / \\ R^1 \quad \quad O \end{array} \right) Y^-$$

wherein R is:
$H_2C=C(R^4)-C(O)Z-A-$
wherein
$R^4$ is hydrogen or methyl,
Z is oxygen or $-NR^5-$
wherein $R^5$ is hydrogen or hydrocarbyl having up to about 10 carbons and A is a ($C_2$-$C_4$) alkylene group having at least two carbon atoms in a chain between the adjoined Z and N+ or polyoxyalkylene group of the formula $$-(CH_2CH_2O)_xCH_2CH_2-$$

wherein
x is 1 to 11
$R^1$ is a linear $C_1$ to $C_4$ alkyl or hydroxyalkyl group,
X is chlorine, bromine or iodine, and
Y is a surfactant anion,
said compound being (A) the reaction product of quarternary ammonium salt and anionic surfactant, (b) efficiently polymerizable via solvent, emulsion or suspension polymerization to form polymers which (i) are stable with anionic additives selected from pigments, thickeners, dyes and fillers, and (ii) in the epoxy form cure with low energy requirements.

2. The compound of claim 1 wherein Z is O and X is chlorine or bromine.

3. The compound of claim 2 wherein $R^1$ is methyl, A is ethylenyl, X is chlorine and Y is a sulfate, sulfonate, phosphonate or sulfosuccinate.

4. The compound of claim 1 wherein Z is $-NR^5-$ and X is chlorine or bromine.

5. The compound of claim 4 wherein $R^1$ is methyl, A is ethylenyl or propylenyl, sulfonate, phosphate or sulfosuccinate.

6. The compound of claim 1 wherein $R^5$ is hydrogen or methyl.

* * * * *